United States Patent
Manchanda et al.

(10) Patent No.: US 10,313,920 B1
(45) Date of Patent: Jun. 4, 2019

(54) USE OF BUFFER FULLNESS AS BASIS TO CONTROL APPLICATION OF MU-MIMO SERVICE

(71) Applicant: Sprint Spectrum L.P., Overland Park, KS (US)

(72) Inventors: Nitesh Manchanda, Overland Park, KS (US); Vanil Parihar, Overland Park, KS (US); Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/716,928

(22) Filed: Sep. 27, 2017

(51) Int. Cl.
*H04W 28/02* (2009.01)
*H04W 24/08* (2009.01)
*H04L 12/26* (2006.01)
*H04L 12/835* (2013.01)

(52) U.S. Cl.
CPC ......... *H04W 28/0278* (2013.01); *H04L 43/16* (2013.01); *H04W 24/08* (2013.01); *H04W 28/0231* (2013.01); *H04W 28/0268* (2013.01); *H04L 43/04* (2013.01); *H04L 47/30* (2013.01)

(58) Field of Classification Search
CPC ............. H04W 72/02; H04W 28/0284; H04W 28/0289; H04L 43/16; H04L 43/0882
See application file for complete search history.

(56) References Cited

U.S. PATENT DOCUMENTS

| | | | |
|---|---|---|---|
| 8,249,647 B2 * | 8/2012 | Karaoguz ............. | H04W 28/18 370/469 |
| 9,554,394 B2 | 1/2017 | Li et al. | |
| 2016/0086386 A1 * | 3/2016 | Son ..................... | G02B 27/017 345/633 |
| 2017/0311200 A1 * | 10/2017 | Koskinen ............. | H04W 28/02 |

OTHER PUBLICATIONS

Hidekazu Taoka et al., "MIMO and CoMP in LTE-Advanced," Technology Reports, NTT DOCOMO Technical Journal, vol. 12, No. 2, Sep. 2010.
Ben Zid Maha and Raoof Kosai, "Multi User MIMO Communication: Basic Aspects, Benefits and Challenges," Intech, 2013.

* cited by examiner

*Primary Examiner* — Wei Zhao (57) ABSTRACT

A method and system for controlling application of MU-MIMO. The disclosure provides for considering the quantity of data buffered for transmission over the air between the base station and each of various UEs, and selecting UEs to be subject to MU-MIMO service based on the quantity of data buffered. For example, a base station could prefer application of MU-MIMO for UEs that have more data buffered for transmission than other UEs. Or the base station could condition application of MU-MIMO to a pair of UEs on a determination that each UE of the pair has at least a threshold quantity of data buffered for transmission.

20 Claims, 4 Drawing Sheets

USE OF BUFFER FULLNESS AS BASIS TO CONTROL APPLICATION OF MU-MIMO SERVICE

BACKGROUND

A typical wireless communication system includes one or more base stations, each providing respective wireless coverage in which to serves user equipment devices (UEs) such as cell phones, computers, tracking devices, embedded wireless modules, and other wirelessly equipped communication devices (whether or not operated by a human user). In turn, each base station could be coupled with network infrastructure, including one or more routers, gateways, and/or switches, that provides connectivity with one or more transport networks, such as the public switched telephone network (PSTN) and/or a packet-switched network such as the Internet. With this arrangement, a UE within coverage of the system could engage in air interface communication with a base station and could thereby communicate via the base station with various remote network entities or with other served UEs.

In practice, such a system could be configured to operate in accordance with a radio access technology, examples of which include without limitation Long Term Evolution (LTE) (using Orthogonal Frequency Division Multiple Access (OFDMA) and Single Carrier Frequency Division Multiple Access (SC-FDMA)), Code Division Multiple Access (CDMA) (e.g., 1×RTT and 1×EV-DO), Global System for Mobile Communications (GSM), WIFI, BLUETOOTH, and others. Each technology could define its own procedures for registration of UEs, initiation of communications, handover between coverage areas, and/or other operations.

Under a representative radio access technology, the air interface between the base station and served UEs defines physical air interface resources that can carry data between the base station the UEs. For example, the air interface could define one or more frequency channels, carriers, or subcarriers on which data can be modulated for transmission. Further, the air interface could be divided over time into intervals in which transmission can occur, and the air interface could define particular time-frequency resources, each occupying particular frequency bandwidth and spanning a particular time interval. The representative radio access technology could define such air interface resources on a downlink for carrying data from the base station to UEs and on an uplink for carrying data from UEs to the base station.

In operation, the base station could then be configured to coordinate use of these air interface resources on an as-needed basis. For example, when the base station has data to transmit to a particular UE, the base station could allocate particular downlink air interface resources to carry that data and could accordingly transmit the data to the UE on the allocated downlink resources. And when a UE has data to transmit to the base station, the UE could request an uplink resource grant, the base station could responsively allocate particular uplink air interface resources to carry the data, and the UE could then transmit the data to the base station on the allocated uplink resources.

One of the key performance metrics of a wireless communication system is its spectral efficiency, namely, the extent of data that the system can carry per frequency spectrum. For instance, the spectral efficiency of a wireless communication system could be measured as a quantity of bits per Hertz.

To help improve spectral efficiency, a base station could be configured to implement Multi-User Multiple-Input-Multiple-Output (MU-MIMO) for its air interface. With MU-MIMO, the base station uses spatially diverse radio-frequency transmission paths to communicate with multiple UEs (typically a pair of UEs) on overlapping/shared air interface resources. For instance, the base station could allocate the same time-frequency resources to two UEs, so that the base station would communicate with the two UEs on the same frequency and at the same time. To facilitate this, the base station could select a pair of UEs that are sufficiently orthogonal to each other, such as UEs that each report a sufficiently high signal-to-noise-plus-interference ratio (SINK), to help avoid interference between their respective communication paths. The base station could then schedule communications with both UEs to occur on the same time-frequency resources, using appropriate precoding and spatial diversity or other mechanisms to help distinguish the communications from one another.

OVERVIEW

A problem with a base station's implementation of MU-MIMU is that it could consume extensive processing and memory resources at the base station. Consequently, it could be useful for a base station to limit its application of MU-MIMO to situations where the MU-MIMO could have the most positive impact on spectral efficiency. Given this, the present disclosure provides for considering the quantity of data to be transmitted over the air between the base station and each of various UEs, and selecting UEs to be subject to MU-MIMO service when there is at least a threshold extent of data buffered for transmission over the air between the base station and each selected UE. More particularly, the disclosure provides for a base station limiting its application of MU-MIMO to UEs that have a threshold extent of data buffered for air interface transmission, and/or preferring application of MU-MIMO to UEs that have more data buffered for air interface transmission than to UEs that have less such data buffered for air interface transmission. In practice, the base station could be configured to carry out this functionality when the base station faces high processing or memory load or in other specific scenarios.

Accordingly, in one respect, disclosed is a method for controlling transmission over an air interface in a wireless communication system. According to the method, a base station serves a plurality of UEs over the air interface, and each UE has a respective transmit buffer (at the UE or at the base station) holding data to be transmitted over the air interface between the UE and the base station. Per the method, each UE's transmit buffer has a respective fullness level that defines a non-zero quantity of data that is in the UE's buffer and is waiting to be transmitted over the air between the UE and the base station. Accordingly, as to the UEs at issue, each UE's transmit buffer contains at least some data to be transmitted over the air interface between the base station and the UE. Further, per the method, the plurality of UEs includes at least two mutually-exclusive pairs of UE, such as pairs of UEs that are sufficiently orthogonal to each other to facilitate MU-MIMO service.

In accordance with the method, the base station selects one of the two pairs of the UEs for the base station to serve with MU-MIMO over the air interface, with the base station's selection of the pair of UEs being based at least on the transmit buffers of the UEs of the selected pair being more full than the transmit buffers of the UEs of the other pair. Based on the selecting, the base station then causes air interface transmission to occur with MU-MIMO between the base station and the UEs of the selected pair but causes transmission to occur without MU-MIMO between the base station and the UEs of the other pair.

In another respect, disclosed is a method for controlling transmission over an air interface in a wireless communication system. The method includes a base station serving a plurality of UEs over the air interface, each UE has a respective transmit buffer holding data to be transmitted over the air interface from the UE to the base station. Further, the method includes the base station receiving, respectively from each UE of the plurality, a buffer status report (BSR) specifying a non-zero quantity of data that is currently held by the UE's respective transmit buffer, awaiting transmission over the air interface from the UE to the base station. And the method involves the base station limiting application of MU-MIMO to UEs of the plurality whose BSRs specify greater than a predefined threshold quantity of data currently awaiting transmission to the base station.

For instance, for each served UE, the base station could determine if the UE's BSR specifies greater than the predefined threshold quantity of data currently awaiting transmission to the base station. And if so, the base station could apply MU-MIMO for the UE's uplink communication to the base station (e.g., pairing the UE with another UE whose BSR also indicates threshold transmit buffer fullness, and scheduling uplink communication from both UEs to occur on the same physical air interface resources as each other, such as on the same time-frequency resources as each other). Whereas if not, the base station could forgo application of MU-MIMO for the UE's uplink communication, even if other factors (such as UE's reported SINR) might justify it.

Still further, in yet another respect, disclosed is a base station operable in a wireless communication system to control transmission over an air interface. In accordance with the disclosure, the base station includes an antenna structure comprising a plurality of antennas for communicating over the air interface, the air interface defining physical channel resources for carrying data wirelessly to the base station from a plurality of UEs served by the base station. Further, the base station includes a controller for scheduling use of the physical channel resources to carry data wirelessly from the UEs to the base station. Per the disclosure, the controller is configured to receive, respectively from each UE of the plurality, a BSR that specifies, respectively per UE, a non-zero quantity of data that is awaiting transmission over the air interface from the UE to the base station. And the controller is configured to limit application of MU-MIMO to UEs of the plurality whose BSRs specify greater than a predefined threshold quantity of data currently awaiting transmission to the base station.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

This description will discuss implementation by way of example in the context of LTE. It will be understood, however, that principles of the disclosure can extend to apply in other scenarios as well, such as with different LTE configurations or with other air interface protocols altogether. More generally, elements, arrangements, and operations could be added, removed, combined, distributed, re-ordered, or otherwise modified. In addition, it will be understood that operations described as being performed by one or more entities could be implemented in various ways, such as by one or more processing units executing program instructions for instance.

Figure 1:
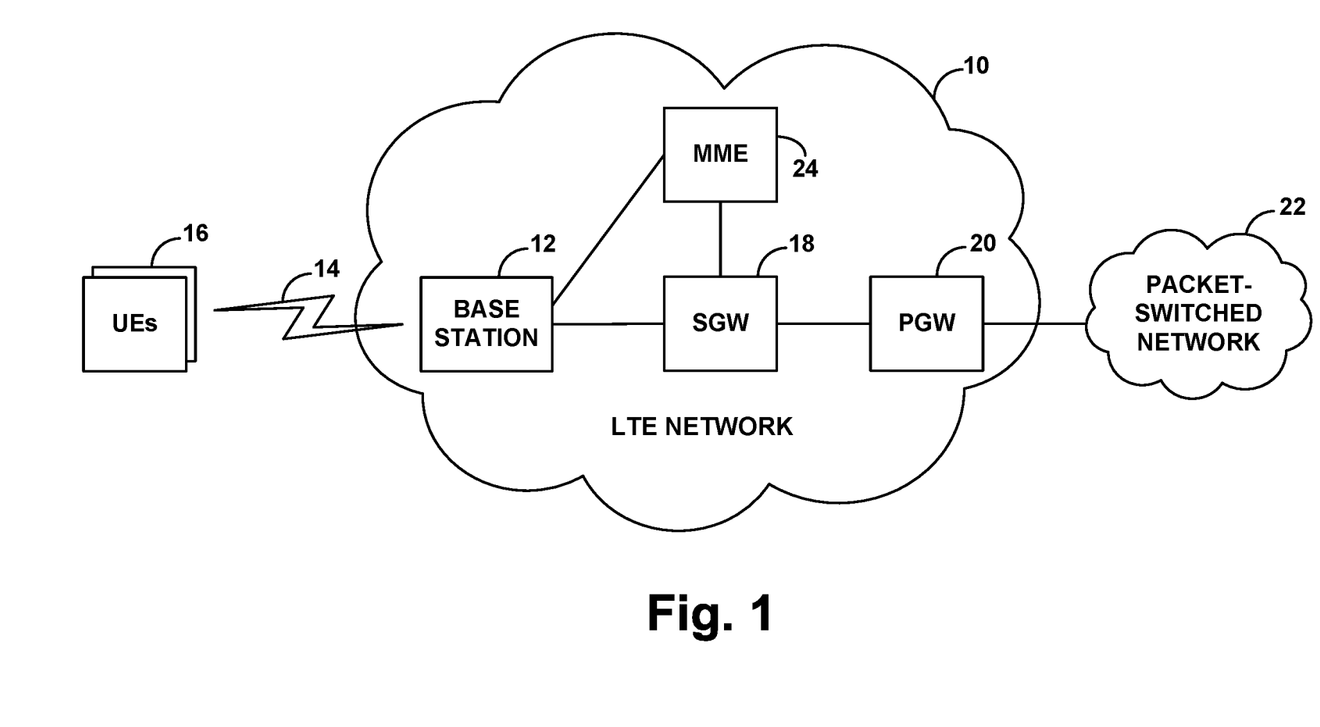
FIG. 1 is a simplified block diagram of a network arrangement in which aspects of the present disclosure can be implemented.

Referring to the drawings, as noted above, FIG. 1 is a simplified block diagram of a wireless communication system in which features of the present disclosure can be implemented. In particular, FIG. 1 depicts an example LTE network 10, which functions primarily to serve UEs with wireless packet data communication service, but may also provide other functions. The LTE network could be implemented by a wireless service provider and could include a core packet-switched network compliant with the industry standard system architecture evolution (SAE) for the LTE protocol. Thus, the entities shown on the network could each have an IP address and be configured to communicate with each other over packet-based tunnels or other communication interfaces, some of which could be dynamically configured as needed to serve UEs.

As shown, the LTE network includes an LTE base station (evolved Node-B (eNodeB)) 12 that provides a coverage area 14 in which the base station is configured to serve UEs 16. The base station 12 is then interfaced with a serving gateway (SGW) 18, which is interfaced with a packet-data network gateway (PGW) 20 that provides connectivity with a packet-switched transport network 22 such as the Internet. Further, the base station 12 is also interfaced with a mobility management entity (MME) 24, which is also interfaced with the SGW 18.

Under LTE, the base station's coverage area 14 defines an air interface on a particular radio-frequency (RF) carrier, which could be frequency division duplex (FDD), where separate frequency channels are provided for concurrent downlink and uplink use, or time division duplex (TDD), where a single frequency channel is multiplexed over time for downlink and uplink use. Each such frequency channel could occupy a particular bandwidth, such as 1.4 MHz, 3 MHz, 5 MHz, 10 MHz, 15 MHz, or 20 MHz, among other possibilities.

Further, the LTE air interface is divided over time into particular transmission time intervals (TTIs). In particular, the air interface is divided into a continuum of 10-millisecond frames, each of which is divided into ten 1-millisecond subframes or TTIs, and each TTI is further divided into two 0.5-millisecond timeslots. In each timeslot, the carrier bandwidth is then divided into 180-kHz-wide physical resource blocks (PRBs), each encompassing twelve 15-kHz subcarriers. In practice, each 180-kHz portion of the air interface could define a pair of 0.5-millisecond PRBs, with one PRB respectively in each timeslot of the TTI, and a pair of such PRBs could be the smallest allocable air interface resource for carrying data communication between a UE and the base station.

On the LTE downlink, each TTI is then divided over time into fourteen 66.7-microsecond symbol time segments (and thus each timeslot and PRB is divided into seven such time segments). As a result, each TTI defines an array of resource elements, each 15 kHz by 66.7 microseconds. And the base station can modulate each resource element to carry data over the air from the base station. In particular, the base station can apply a modulation scheme that maps bits of a coded data stream to modulation symbols, and the base station can modulate each modulation symbol on the subcarrier of a respective resource element for transmission.

LTE further reserves certain downlink resource elements for special purposes. For instance, the first 1-3 symbol time segments per downlink TTI are generally reserved to define a downlink control region for carrying control signaling from the base station, and the remaining symbol time segments per downlink TTI are generally reserved to define a downlink shared channel, in which PRBs are allocable by the base station to carry data over the air from the base station on as as-needed basis. Further, various resource elements distributed throughout each downlink TTI are reserved to carry a reference signal that UEs can measure to evaluate coverage quality, and other resource elements are reserved for other purposes.

On the uplink, on the other hand, LTE uses SC-FDMA, in which individual modulation symbols are be spread across a group of subcarriers, such as across the 180-kHz width of a PRB, to facilitate greater power-efficiency for transmission from UEs to the base station. A UE could thus apply a modulation scheme that maps bits of a coded data stream to modulation symbols, and the UE could modulate each modulation symbol across a group of subcarriers for transmission to the base station.

Further, LTE then reserves certain uplink PRBs for special purposes. For instance, the PRBs at the low-end and the high-end of the frequency bandwidth in each uplink TTI are generally reserved to define an uplink control region for carrying control signaling from UEs to the base station, and the remaining PRBs throughout the frequency bandwidth in each uplink TTI are generally reserved to define an uplink shared channel, in which PRBs are allocable by the base station to carry data over the air to the base station on an as-needed basis.

As each UE enters into coverage of such a system, the UE could determine that coverage strength from base station 12 is sufficient and could then engage in a process to connect with the base station and register for service with the network. In particular, the UE and base station could engage in random-access and Radio Resource Control (RRC) signaling to establish an RRC connection defining a radio-link-layer connection over the air between the UE and the base station, and the base station could establish a context record for the UE indicating the established RRC connection. Further, the UE could engage in signaling with the MME 24 via the base station to attach with the network. And through this attachment process, the MME could coordinate establishment for the UE of one or more bearers defining logical tunnels between the UE and the PGW 20 to enable the UE to engage in packet-data communication on transport network 22.

Once the UE is so connected and attached, the base station could then serve the UE with data communications over the air.

For instance, as data arrives on the transport network for transmission to the UE, the data could flow via a bearer to the base station, and the base station could hold the data in a UE-specific buffer that is defined in data storage at the base station, awaiting transmission of the data over the air to the UE. Given data in such a buffer, the base station could then allocate one or more downlink PRBs to carry the data to the UE, the base station could transmit to the UE a downlink control information (DCI) message specifying the allocated downlink PRBs, and the base station could transmit the data to the UE in the specified PRBs.

Likewise, when the UE has data to transmit on the transport network, the UE could store the data in a buffer that is defined in data storage of the UE, and the UE could then transmit to the base station a scheduling request that requests allocation of uplink resources to carry the data. In response, the base station could then allocate one or more uplink PRBs to carry the data from the UE and could transmit to the UE a DCI specifying the allocated uplink PRBs, and the UE could then transmit the data to the base station in the specified PRBs.

As each UE is being served by the base station, the UE could transmit provide various reports to the base station to help facilitate the base station's service of the UE.

For instance, the UE could transmit to the base station reports of channel quality between the UE and the base station. Such reports could include a channel quality index (CQI) value that represents a level of channel quality based on the UE's evaluation of the base station's reference signal and other factors. Alternatively or additionally, such reports could specify other channel quality metrics, such as reference signal receive power (RSRP), reference signal receive quality (RSRQ), and/or SINR, among other possibilities. The UE could be configured to provide these or other such channel quality reports to the base station periodically and/or in response to various triggers. Further, the UE could transmit these reports via signaling in the uplink control region and/or within uplink shared-channel resources allocated by the base station.

As another example, the UE could transmit to the base station buffer status reports (BSRs) that indicate how full the UE's transmit buffer is, and thus how much data the UE has awaiting transmission over the air from the UE to the base station. LTE defines a series of BSR index values each corresponding with a respective quantity of buffered data. In particular, LTE provides mapping tables that map index values 0 through 63 to respectively increasing data-quantity ranges (with 0 representing an empty buffer, and 63 representing the greatest quantity buffered). To provide a BSR, the UE thus determines how much data is in the UE's transmit buffer and maps that quantity to a BSR index value, and the UE transmits the BSR index value to the base station. Further, the UE could carry out this process respectively per logical channel group (per class or type of data).

The UE could be configured to transmit a BSR to the base station periodically or in response to various triggers. For instance, when the UE has data buffered for transmission, the UE could generate and transmit to the base station a scheduling request that carries the BSR. Further, the UE could transmit a BSR to the base station within the uplink control region and/or together with data that the UE transmits to the base station in allocated uplink shared-channel resources.

As the base station serves multiple UEs, the base station may thus receive BSRs from the multiple UEs and thereby learn how much data each UE has buffered for transmission. Provided with this information, the base station then applies a scheduling algorithm to fairly and efficiently allocate uplink resources to the various UEs to facilitate uplink transmission.

As noted above, the base station could also be configured to apply MU-MIMO for air interface communication with its served UEs. In particular, as indicated, the base station could identify pairs of it served UEs 16, with each pair of UEs being sufficiently orthogonal to each other (e.g., each having sufficiently high reported SINR or the like). For each such pair, the base station could then schedule communications with both UEs of the pair to occur on the same time-frequency resources, using appropriate precoding and spatial diversity or other mechanisms to help distinguish the communications from one another. Those of ordinary skill in the art are familiar with the baseline process for identifying pairs of UEs to be subject to MU-MIMO service and the process of applying MU-MIMO service for transmission over the air between the base station and the UEs of each such pair, as well as the configurations of the base station and UEs to facilitate these processes. Therefore, this description will not discuss specifics of those processes or configurations.

In accordance with the present disclosure, as further noted above, the base station could limit its application of MU-MIMO in a given instance to UEs for which there is sufficient data buffered for transmission over the air between the base station and the UEs. The assumption here is that there are at least two mutually exclusive pairs of UEs served by the base station that could be subject to MU-MIMO service, perhaps given that the UEs of each pair are deemed to be sufficiently orthogonal to each other. At issue in accordance with the disclosure could then be which of those pairs of UEs the base station would select to be subject to MU-MIMO service. And in accordance with the disclosure, the decision of whether or not a given pair of UEs will be subject to MU-MIMO service will be based at least in part on how much data is buffered for transmission between the base station and the UEs of the pair. This could be done for downlink communication, considering data buffered in UE-specific buffers at the base station, or for uplink communication, considering data buffered at the individual UEs as reported by their BSRs.

As indicated above, for instance, the base station could select one of the two pairs of UEs to be subject to MU-MIMO service (i.e., decide to apply MU-MUMO service for communication with just one of the two pairs, and not for communication with the other), with the selecting being based on there being more data buffered for transmission between the base station and each UE of the selected pair than between the base station and each UE of the other (non-selected) pair.

For instance, given a first pair of served UEs and a second pair of served UEs, perhaps the BSRs most recently received from the UEs of the first pair each specify a respective BSR index value that is over 40, and the BSRs most recently received from the UEs of the second pair each specify a BSR index value that is under 30. Given that the UEs of the first pair each have more data buffered for transmission to the base station than the UEs of the second pair, the base station could select the first pair to be subject to MU-MIMO service. Thus, the base station could apply MU-MIMO service for communication from the UEs of the first pair (scheduling data transmission from the UEs of the first pair to occur on the same time-frequency resources) but could serve the UEs of the second pair without MU-MIMO service (scheduling data transmission from the UEs of the second pair to occur on different time-frequency resources).

Likewise, for downlink communication, given a first pair of UEs and a second pair of UEs, the base station could similarly evaluate the quantity of data currently buffered in UE-specific buffers at the base station and could similarly select one of the pairs of UEs to be subject to MU-MIMO service. The base station could then apply MU-MIMO service for communication to the UEs of the selected pair (scheduling data transmission to the UEs of the selected pair to occur on the same time-frequency resources) but could serve the UEs of the other pair without MU-MIMO service (scheduling data transmission to the UEs of the second pair to occur on different time-frequency resources).

Alternatively or additionally, the base station could limit application of MU-MIMO service to UEs that have a threshold sufficient extent of data buffered for transmission. For example, for uplink transmission, the base station could apply MU-MIMO service for a pair of UEs only if the BSR index value most recently reported by each UE of the pair is greater than (or, equivalently, at least) a predefined high reported BSR index value such as 10 (or a different defined threshold value). Thus, if both UEs of a given pair of UEs has a most recently reported BSR index value that is greater than the predefined threshold value, then the base station could consider the pair of UEs to be a candidate pair for MU-MIMO service. Whereas, if either UE of a pair of UEs has a most recently reported BSR index value that is not greater than the predefined threshold value, then the base station could consider the pair of UEs to not be a candidate pair for MU-MIMO service.

In practice, the base station could analyze the level of buffer fullness for UEs after the base station has identified pairs of UEs for possible MU-MIMO service, so as to then determine whether to apply MU-MIMO service for air interface communication with the UEs of a given pair. For instance, the base station could first identify pairs of UEs for possible MU-MIMO service based on the UEs of each pair being sufficiently orthogonal, and the base station could then decide based on the buffer fullness analysis which if any of the pairs should be subject to MU-MIMO service. The base station could thereby decide that a given identified pair should be subject to MU-MIMO service and could proceed to serve the UEs of the pair using MU-MIMO. Or the base station could thereby decide that a given identified pair should not be subject to MU-MIMO service and could proceed to serve the UEs of the pair without using MU-MIMO.

Alternatively, the base station could analyze the level buffer fullness per UE concurrent with the base station's analysis of one or more other MU-MIMO factors, such as UE orthogonality. For instance, for a given direction of communication (uplink or downlink), the base station could determine for each of its served UEs (i) the UE's buffer fullness level and (ii) the UE's level of orthogonality, such as SINR. And the base station could then identify a pair of UEs for MU-MIMO service in response to determining that each UE of the pair has threshold high buffer fullness and has sufficient orthogonality. The base station could then serve that pair of UEs with MU-MIMO. Whereas, the base station could identify one or more other UEs based on each such UE having insufficient buffer fullness and/or being insufficient orthogonality, and the base station could forgo application of MU-MIMO service to each such UE.

Figure 2:
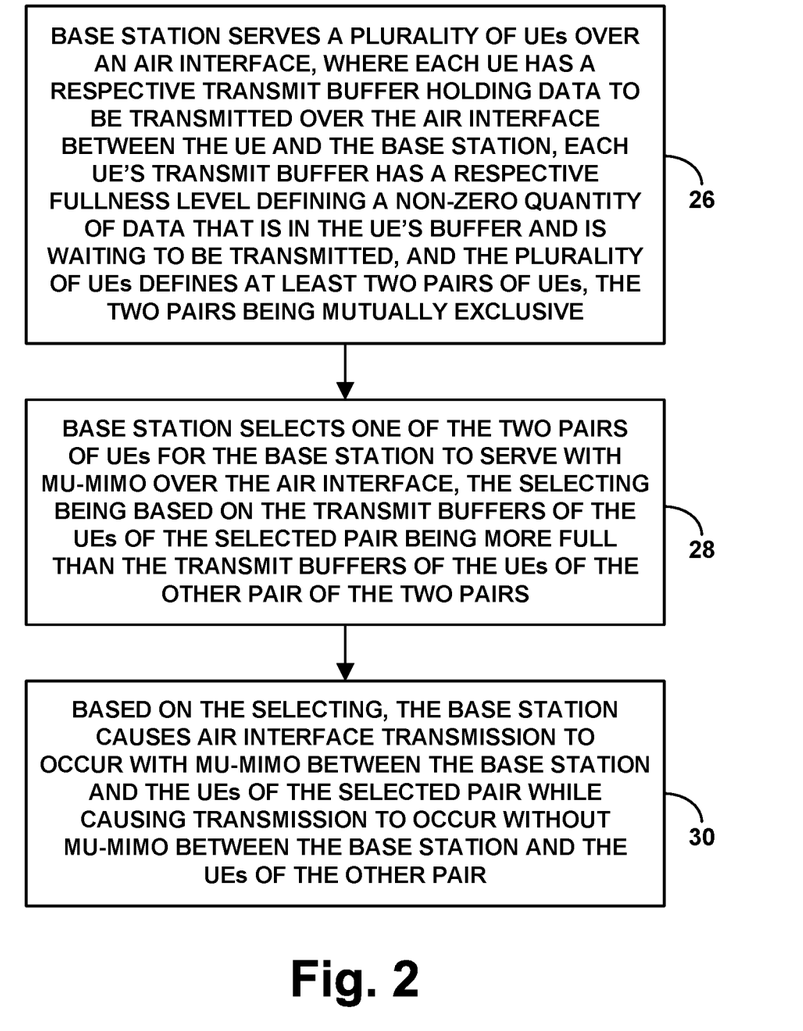
FIG. 2 is a flow chart depicting operations that can be carried out in accordance with the disclosure.

FIG. 2 is next a flow chart depicting operations that can be carried out in accordance with this disclosure, to control transmission over an air interface in a wireless communication system. As shown in FIG. 2, at block 26, a base station serves a plurality of UEs over the air interface, where each UE has (at the UE or base station) a respective transmit buffer holding data to be transmitted over the air interface between the UE and the base station, each UE's transmit buffer has a respective fullness level defining a non-zero quantity of data that is in the UE's buffer and is waiting to be transmitted, and the plurality of UEs defines at least two pairs of UEs, the two pairs being mutually exclusive. At blocks 28 and 30, concurrent with block 26, the base station then selectively applies MU-MIMO. Namely, at block 28, the base station selects one of the two pairs of UEs for the base station to serve with MU-MIMO over the air interface, the selecting being based on the transmit buffers of the UEs of the selected pair being more full than the transmit buffers of the UEs of the other pair of the two pairs. And at block 30, based on the selecting, the base station causes air interface transmission to occur with MU-MIMO between the base station and the UEs of the selected pair while causing transmission to occur without MU-MIMO between the base station and the UEs of the other pair.

In line with the discussion above, the UE's transmit buffer in this method could be an uplink transmit buffer at the UE, which could hold data for transmission from the UE to the base station. And in that case, the method could additionally include the base station receiving from each UE of the plurality a respective BSR that indicates the UE's buffer fullness level. Further, the method could then include the selecting being based the BSRs (e.g., indicated quantities of buffered data) of the UEs of one of the two pairs and the BSRs of the UEs of the other pair. For instance, the method could be based on a comparison of the BSRs of the UEs of the selected pair with the BSRs of the UEs of the other pair. Alternatively, each UE's transmit buffer could be a downlink transmit buffer at the base station, holding data for transmission from the base station to the UE.

As further discussed above, the selecting of one of the two pairs of UEs for the base station to serve with MU-MIMO over the air interface could additionally be based on a determination by the base station that SINK of each UE of the selected pair is threshold high.

Moreover, the act of the base station causing air interface transmission to occur with MU-MIMO between the base station and the UEs of the selected pair could involve the base station causing air interface transmission between the base station and a first UE of the selected pair to occupy same time-frequency air interface resources as air interface transmission between the base station a second UE of the selected pair. Whereas, the act of the base station causing air interface transmission to occur without MU-MIMO between the base station and the UEs of the other pair could involve the base station causing air interface transmission between the base station and a first UE of the other pair to occupy different time-frequency air interface resources than air interface transmission between the base station and a second UE of the other pair.

Figure 3:
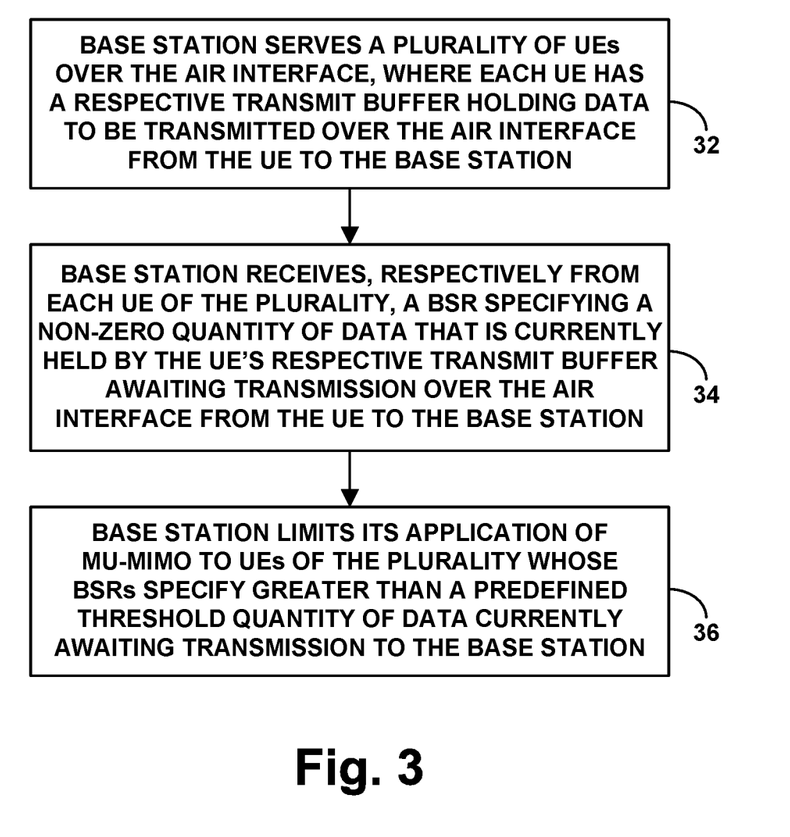
FIG. 3 is another flow chart depicting operations that can be carried out in accordance with the disclosure.

FIG. 3 is another flow chart depicting operations that can be carried out in accordance with this disclosure, to control transmission over an air interface in a wireless communication system. As shown in FIG. 3, at block 32, the base station serves a plurality of UEs over the air interface, where each UE has a respective transmit buffer holding data to be transmitted over the air interface from the UE to the base station. At block 34 and 36, concurrent with block 32, the base station limits its application of MU-MIMO. Namely, at block 34, the base station receives, respectively from each UE of the plurality, a BSR specifying a non-zero quantity of data that is currently held by the UE's respective transmit buffer awaiting transmission over the air interface from the UE to the base station. And at block 36, the base station limits its application of MU-MIMO to UEs of the plurality whose BSRs specify greater than a predefined threshold quantity of data currently awaiting transmission to the base station.

In line with the discussion above, each UE's BSR could specify the non-zero quantity of data that is currently held by the UE's transmit buffer by specifying a BSR index selected from an increasing sequence of BSR indexes corresponding respectively with an increasing quantity of buffered data. For instance, this could be based on a table that maps BSR indexes with buffered data quantities. The act of the base station limiting application of MU-MIMO to UEs of the plurality whose BSRs specify greater than the predefined threshold quantity of data currently awaiting transmission to the base station could then involve the base station limiting application of MU-MIMO to UEs of the plurality whose BSRs specify a BSR index that is at least a predefined threshold high BSR index. For example, the sequence of BSR indexes representing non-zero quantities of buffered data could range from 1 to 63, and the predefined threshold high BSR index could be at least 10. Other examples are possible as well.

In addition, the act of the base station limiting application of MU-MIMO to UEs of the plurality whose BSRs specify greater than the predefined threshold quantity of data currently awaiting transmission to the base station could involve (a) the base station selecting a first UE of the plurality to receive MU-MIMO service, where the selecting is based at least on (i) the BSR of the first UE specifying at least the predefined threshold quantity of data currently awaiting transmission to the base station and (ii) the first UE reporting to the base station at least a threshold high SINR for the air interface and (b) the base station rejecting application of MU-MIMO service for a second UE of the plurality, where the rejecting is based at least on the BSR of the second UE specifying less than the predefined threshold quantity of data currently awaiting transmission to the base station.

Here, the act of rejecting application of MU-MIMO service for the second UE could be notwithstanding the second UE reporting to the base station at least the threshold high SINK for the air interface. That is, even though the second UE might meet one or more orthogonality criteria for MU-MIMO service and even though the second UE has some data buffered for transmission, the base station could still reject application of MU-MIMO for that UE on grounds that the UE does not have sufficient data buffered for transmission.

Further, the act of the base station limiting application of MU-MIMO to UEs of the plurality whose BSRs specify greater than the predefined threshold quantity of data currently awaiting transmission to the base station could involve (a) the base station causing air interface transmission from the first UE to occur with MU-MIMO, including the base station causing the air interface transmission from the first UE to the base station to occupy time-frequency resources that are also occupied by air interface transmission from a third UE to the base station and (b) the base station causing air interface transmission from the second UE to occur without MU-MIMO, including the base station causing the air interface transmission from the second UE to the base station to occupy time-frequency resources that are not also occupied by air interface transmission from any other UE (other than the second UE) to the base station.

Figure 4:
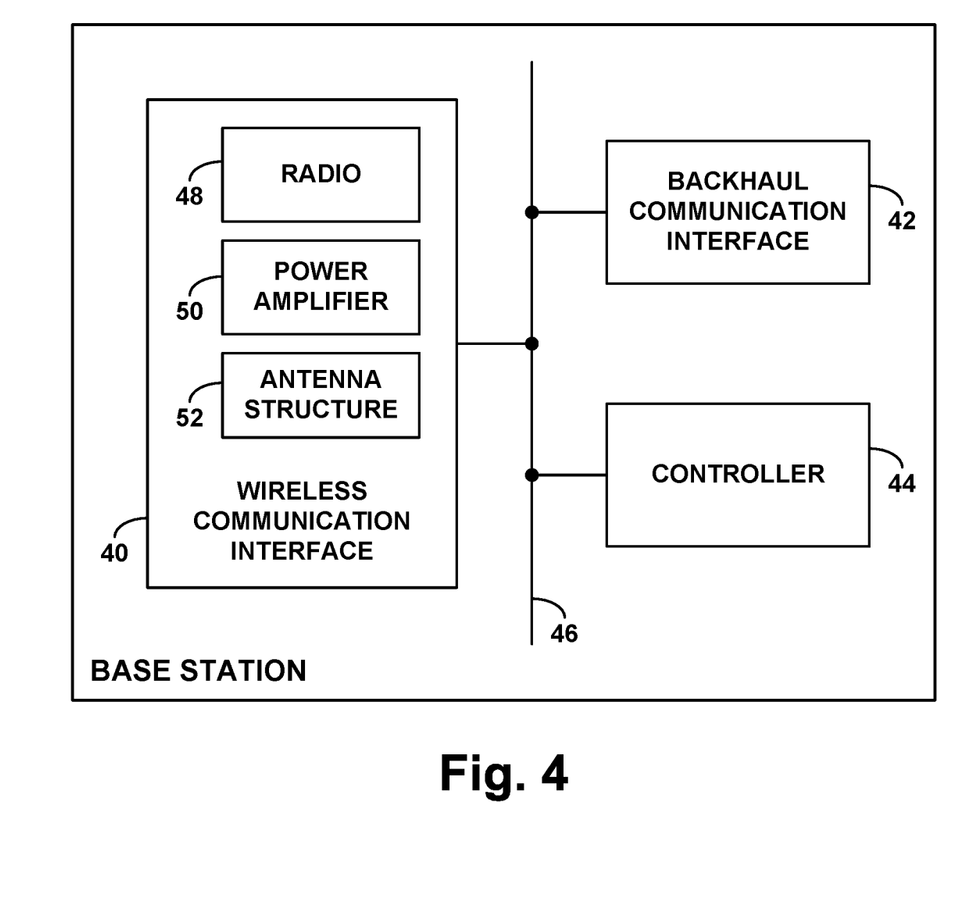
FIG. 4 is a simplified block diagram of a base station operable in accordance with the disclosure.

Finally, FIG. 4 is a simplified block diagram of an example base station that could operate in accordance with the present disclosure. to control transmission over an air interface in a wireless communication system.

As shown in FIG. 4, the example base station includes a wireless communication interface 40, a backhaul communication interface 42, and a controller 44, which could be integrated together and/or communicatively linked by a network, system bus, or other connection mechanism 46.

Wireless communication interface 40 includes a radio 48, a power amplifier 50, and antenna structure 52. The radio could operate to interface between encoded baseband signals and RF signals. The power amplifier could operate to amplify signals for transmission by the antenna structure 52. And the antenna structure 52 could comprise a plurality of antennas for communicating over the air interface, where the air interface defines physical channel resources for carrying data wirelessly to the base station from a plurality of UEs served by the base station.

Backhaul communication interface 42 could be a network communication interface (e.g., an Ethernet network interface port and/or connection) through which the base station can communicate with various other network entities.

And controller 44, which could comprise a processing unit, data storage, and program instructions stored in the data storage and executable by the processing unit, or could take other forms, could be operable to cause the base station to carry out various operations as described herein, to schedule use of the physical channel resources to carry data wirelessly from the UEs to the base station. In this or another manner, the controller could be configured to receive, respectively from each UE of the plurality, a BSR specifying a non-zero quantity of data that is awaiting transmission over the air interface from the UE to the base station. And the controller could be configured to limit application of MU-MIMO to UEs of the plurality whose BSRs specify greater than a predefined threshold quantity of data currently awaiting transmission to the base station.

Various features described above could be applied in this context, and vice versa.

For example, each UE's BSR could specify the non-zero quantity of data that is currently held by the UE's transmit buffer by specifying a BSR index selected from an increasing sequence of BSR indexes corresponding respectively with an increasing quantity of buffered data. And limiting application of MU-MIMO to UEs of the plurality whose BSRs specify greater than the predefined threshold quantity of data currently awaiting transmission to the base station could involve limiting application of MU-MIMO to UEs of the plurality whose BSRs specify a BSR index that is at least a predefined threshold high BSR index. For instance, as noted above, the sequence of BSR indexes representing non-zero quantities of buffered data could range from 1 to 63, and the predefined threshold high BSR index could be at least 10.

Further, the act of limiting application of MU-MIMO to UEs of the plurality whose BSRs specify greater than the predefined threshold quantity of data currently awaiting transmission to the base station could involve (a) selecting a first UE of the plurality to receive MU-MIMO service, where the selecting is based at least on (i) the BSR of the first UE specifying at least the predefined threshold quantity of data currently awaiting transmission to the base station and (ii) the first UE reporting to the base station at least a threshold high signal-to-interference-plus-noise ratio (SINR) for the air interface, and (b) rejecting application of MU-MIMO service for a second UE of the plurality, where the rejecting is based at least on the BSR of the second UE specifying less than the predefined threshold quantity of data currently awaiting transmission to the base station. And if applicable, the rejecting could be notwithstanding the second UE reporting to the base station at least the threshold high SINR for the air interface.

Moreover, as discussed above, the act of limiting application of MU-MIMO to UEs of the plurality whose BSRs specify greater than the predefined threshold quantity of data currently awaiting transmission to the base station further could involve (a) causing air interface transmission from the first UE to occur with MU-MIMO, including causing the air interface transmission from the first UE to the base station to occupy instances of the physical channel resources that are also occupied by air interface transmission from a third UE to the base station, and (b) causing air interface transmission from the second UE to occur without MU-MIMO, including causing the air interface transmission from the second UE to the base station to occupy instances of the physical channel resources that are not also occupied by air interface transmission from any other UE to the base station. In an example implementation, the physical channel resources comprise discrete time-frequency resources.

Exemplary embodiments have been described above. Those skilled in the art will understand, however, that changes and modifications may be made to these embodiments without departing from the true scope and spirit of the invention.

We claim:

1. A method for controlling transmission over an air interface in a wireless communication system, the method comprising:

serving, by a base station, a plurality of user equipment devices (UEs) over the air interface, wherein each UE has a respective transmit buffer holding data to be transmitted over the air interface between the UE and the base station, wherein each UE's transmit buffer has a respective fullness level defining a non-zero quantity of data that is in the UE's transmit buffer and is waiting to be transmitted, and wherein the plurality of UEs defines at least two pairs of UEs, the two pairs being mutually exclusive;

selecting, by the base station, one of the two pairs of UEs for the base station to serve with Multi-User Multiple-Input-Multiple-Output (MU-MIMO) over the air interface, the selecting being based on the transmit buffers of the UEs of the selected pair being more full than the transmit buffers of the UEs of the other pair of the two pairs; and based on the selecting, causing by the base station air interface transmission to occur with MU-MIMO between the base station and the UEs of the selected pair while causing by the base station transmission to occur without MU-MIMO between the base station and the UEs of the other pair.

2. The method of claim 1, wherein each UE's transmit buffer is an uplink transmit buffer at the UE, holding data for transmission from the UE to the base station, the method further comprising receiving by the base station from each UE a respective buffer status report (BSR) indicating the UE's buffer fullness level, wherein the selecting is based on a comparison of the BSRs of the UEs of one of the two pairs with the BSRs of the UEs of the other pair.

3. The method of claim 1, wherein each UE's transmit buffer is an uplink transmit buffer at the UE, holding data for transmission from the UE to the base station, the method further comprising receiving by the base station from each UE a respective buffer status report (BSR) indicating the UE's buffer fullness level, wherein the selecting is based on the BSRs of the UEs of the selected pair and the BSRs of the UEs of the other pair.

4. The method of claim 1, wherein the selecting of the one of the two pairs of UEs for the base station to serve with MU-MIMO over the air interface is additionally based on a determination by the base station that signal-to-interference-plus-noise ratio (SINK) of each UE of the selected pair is threshold high.

5. The method of claim 1,
wherein causing by the base station air interface transmission to occur with MU-MIMO between the base station and the UEs of the selected pair comprises causing by the base station air interface transmission between the base station and a first UE of the selected pair to occupy same time-frequency air interface resources as air interface transmission between the base station a second UE of the selected pair, and
wherein causing by the base station air interface transmission to occur without MU-MIMO between the base station and the UEs of the other pair comprises causing by the base station air interface transmission between the base station and a first UE of the other pair to occupy different time-frequency air interface resources than air interface transmission between the base station and a second UE of the other pair.

6. The method of claim 1, wherein each UE's transmit buffer is a downlink transmit buffer at the base station, holding data for transmission from the base station to the UE.

7. A method for controlling transmission over an air interface in a wireless communication system, the method comprising:
serving, by a base station, a plurality of user equipment devices (UEs) over the air interface, wherein each UE has a respective transmit buffer holding data to be transmitted over the air interface from the UE to the base station;
receiving by the base station, respectively from each UE of the plurality, a buffer status report (BSR) specifying a non-zero quantity of data that is currently held by the UE's respective transmit buffer awaiting transmission over the air interface from the UE to the base station; and
limiting by the base station application of Multi-User Multiple-Input-Multiple-Output (MU-MIMO) to UEs of the plurality whose BSRs specify greater than a predefined threshold quantity of data currently awaiting transmission to the base station.

8. The method of claim 7,
wherein each UE's BSR specifies the non-zero quantity of data that is currently held by the UE's transmit buffer by specifying a BSR index selected from an increasing sequence of BSR indexes corresponding respectively with an increasing quantity of buffered data, and
wherein limiting by the base station application of MU-MIMO to UEs of the plurality whose BSRs specify greater than the predefined threshold quantity of data currently awaiting transmission to the base station comprises limiting by the base station application of MU-MIMO to UEs of the plurality whose BSRs specify a BSR index that is at least a predefined threshold high BSR index.

9. The method of claim 8, wherein the sequence of BSR indexes representing non-zero quantities of buffered data ranges from 1 to 63, and wherein the predefined threshold high BSR index is at least 10.

10. The method of claim 7, wherein limiting by the base station application of MU-MIMO to UEs of the plurality whose BSRs specify greater than the predefined threshold quantity of data currently awaiting transmission to the base station comprises:
selecting by the base station a first UE of the plurality to receive MU-MIMO service, wherein the selecting is based at least on (i) the BSR of the first UE specifying at least the predefined threshold quantity of data currently awaiting transmission to the base station and (ii) the first UE reporting to the base station at least a threshold high signal-to-interference-plus-noise ratio (SINR) for the air interface; and
rejecting by the base station application of MU-MIMO service for a second UE of the plurality, wherein the rejecting is based at least on the BSR of the second UE specifying less than the predefined threshold quantity of data currently awaiting transmission to the base station.

11. The method of claim 10, wherein the rejecting application of MU-MIMO service for the second UE is notwithstanding the second UE reporting to the base station at least the threshold high SINK for the air interface.

12. The method of claim 10, wherein limiting by the base station application of MU-MIMO to UEs of the plurality whose BSRs specify greater than the predefined threshold quantity of data currently awaiting transmission to the base station further comprises:
causing by the base station air interface transmission from the first UE to occur with MU-MIMO, including causing by the base station the air interface transmission from the first UE to the base station to occupy time-frequency resources that are also occupied by air interface transmission from a third UE to the base station; and
causing by the base station air interface transmission from the second UE to occur without MU-MIMO, including causing by the base station the air interface transmission from the second UE to the base station to occupy time-frequency resources that are not also occupied by air interface transmission from any other UE to the base station.

13. A base station operable in a wireless communication system to control transmission over an air interface, the base station comprising:
an antenna structure comprising a plurality of antennas for communicating over the air interface, wherein the air interface defines physical channel resources for carrying data wirelessly to the base station from a plurality of user equipment devices (UEs) served by the base station; and
a controller for scheduling use of the physical channel resources to carry the data wirelessly from the UEs to the base station,
wherein the controller is configured to receive, respectively from each UE of the plurality, a buffer status report (BSR) specifying a non-zero quantity of data that is awaiting transmission over the air interface from the UE to the base station, and
wherein the controller is configured to limit application of Multi-User Multiple-Input-Multiple-Output (MU-MIMO) to UEs of the plurality whose BSRs specify greater than a predefined threshold quantity of data currently awaiting transmission to the base station.

14. The base station of claim 13, wherein the controller comprises a processing unit, data storage, and program instructions stored in the data storage and executable by the processing unit to carry out the receiving and the limiting.

15. The base station of claim 13,
wherein each UE's BSR specifies the non-zero quantity of data that is currently held by the UE's transmit buffer by specifying a BSR index selected from an increasing sequence of BSR indexes corresponding respectively with an increasing quantity of buffered data, and
wherein limiting application of MU-MIMO to UEs of the plurality whose BSRs specify greater than the predefined threshold quantity of data currently awaiting transmission to the base station comprises limiting application of MU-MIMO to UEs of the plurality whose BSRs specify a BSR index that is at least a predefined threshold high BSR index.

16. The base station of claim 15, wherein the sequence of BSR indexes representing non-zero quantities of buffered data ranges from 1 to 63, and wherein the predefined threshold high BSR index is at least 10.

17. The base station of claim 13, wherein limiting the application of MU-MIMO to UEs of the plurality whose BSRs specify greater than the predefined threshold quantity of data currently awaiting transmission to the base station comprises:
selecting a first UE of the plurality to receive MU-MIMO service, wherein the selecting is based at least on (i) the BSR of the first UE specifying at least the predefined threshold quantity of data currently awaiting transmission to the base station and (ii) the first UE reporting to the base station at least a threshold high signal-to-interference-plus-noise ratio (SINR) for the air interface; and
rejecting application of MU-MIMO service for a second UE of the plurality, wherein the rejecting is based at least on the BSR of the second UE specifying less than the predefined threshold quantity of data currently awaiting transmission to the base station.

18. The base station of claim 17, wherein the rejecting application of MU-MIMO service for the second UE is notwithstanding the second UE reporting to the base station at least the threshold high SINR for the air interface.

19. The method of claim 17, wherein limiting the application of MU-MIMO to UEs of the plurality whose BSRs specify greater than the predefined threshold quantity of data currently awaiting transmission to the base station further comprises:
causing air interface transmission from the first UE to occur with MU-MIMO, including causing the air interface transmission from the first UE to the base station to occupy instances of the physical channel resources that are also occupied by air interface transmission from a third UE to the base station; and
causing air interface transmission from the second UE to occur without MU-MIMO, including causing the air interface transmission from the second UE to the base station to occupy instances of the physical channel resources that are not also occupied by air interface transmission from any other UE to the base station.

20. The method of claim 19, wherein the physical channel resources comprise discrete time-frequency resources.

* * * * *